US012277809B2

(12) United States Patent
Majerus et al.

(10) Patent No.: US 12,277,809 B2
(45) Date of Patent: Apr. 15, 2025

(54) VEHICLE DIAGNOSIS AND REPAIR

(71) Applicant: Micron Technology, Inc., Boise, ID (US)

(72) Inventors: Diana C. Majerus, Boise, ID (US); Raksha Gopal Kulkarni, Boise, ID (US); Bhumika Chhabra, Boise, ID (US); Bethany M. Grentz, Meridian, ID (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 18/527,551

(22) Filed: Dec. 4, 2023

(65) Prior Publication Data

US 2024/0104968 A1 Mar. 28, 2024

Related U.S. Application Data

(63) Continuation of application No. 17/221,894, filed on Apr. 5, 2021, now Pat. No. 11,837,032.

(60) Provisional application No. 63/132,606, filed on Dec. 31, 2020.

(51) Int. Cl.
*G07C 5/00* (2006.01)
*G07C 5/08* (2006.01)

(52) U.S. Cl.
CPC ............. *G07C 5/006* (2013.01); *G07C 5/008* (2013.01); *G07C 5/0808* (2013.01); *G07C 2205/02* (2013.01)

(58) Field of Classification Search
CPC ...... G07C 5/006; G07C 5/008; G07C 5/0808; G07C 2205/02
USPC ......................................................... 701/29.4
See application file for complete search history.

(56) References Cited

U.S. PATENT DOCUMENTS

| | | | | |
|---|---|---|---|---|
| 5,819,201 A * | 10/1998 | DeGraaf | G07C 5/006 | 73/178 R |
| 6,604,033 B1 * | 8/2003 | Banet | G01M 15/102 | 701/34.3 |
| 7,356,393 B1 * | 4/2008 | Schlatre | G06Q 10/06 | 701/36 |
| 7,650,210 B2 * | 1/2010 | Breed | G07C 5/008 | 701/31.9 |
| 8,125,322 B2 * | 2/2012 | Yoshida | B60C 23/0408 | 701/32.7 |
| 8,694,196 B1 * | 4/2014 | Doulatshahi | G06Q 10/06 | 701/29.2 |

(Continued)

*Primary Examiner* — Kurt Philip Liethen
*Assistant Examiner* — John D Bailey
(74) *Attorney, Agent, or Firm* — Brooks, Cameron & Huebsch, PLLC

(57) ABSTRACT

Apparatuses, machine-readable media, and methods related to vehicle diagnosis and repair are described. Receiving vehicle status information from a control panel and/or on board diagnostic (OBD) unit of a vehicle at a vehicle diagnosis and repair too can provide valuable information to an owner and/or user of a vehicle. Computing devices (e.g., mobile devices and/or modules having a computing device) can be configured to run an application (e.g., a vehicle diagnosis and repair tool) to determine whether a vehicle needs to be repaired or serviced according to examples of the present disclosure. The vehicle diagnosis and repair tool can receive vehicle status information, determine the repairs and/or service that the vehicle needs, and initiate the vehicle repairs and/or service.

20 Claims, 4 Drawing Sheets

(56) References Cited

U.S. PATENT DOCUMENTS 8,775,010 B2 * 7/2014 Sohmshetty ........ G06F 16/2465 700/110
8,880,274 B2 11/2014 Chenn
8,886,393 B2 * 11/2014 Edwards ................ G07C 5/008 701/29.1
8,897,951 B1 * 11/2014 Knox ........................ B64F 5/40 701/31.4
9,520,006 B1 * 12/2016 Sankovsky .............. G07C 5/02
9,792,738 B1 * 10/2017 Adderly ............. G01C 21/3679
10,445,950 B1 * 10/2019 De ........................ G07C 5/0825
10,891,694 B1 * 1/2021 Leise ................... G08G 1/0112
10,994,727 B1 * 5/2021 Kumar ................. G08G 1/0129
11,017,476 B1 * 5/2021 Gainer ................... G06Q 40/08
11,281,286 B1 * 3/2022 Kajuluri ............... G07C 5/0808
11,455,841 B1 * 9/2022 Brunda ................ G07C 5/0808
11,710,355 B1 * 7/2023 Wenneman ........... H04L 67/141 701/29.3
11,928,898 B2 * 3/2024 Olalere .............. G06Q 30/0283
2002/0133273 A1 * 9/2002 Lowrey ................. G01M 15/04 340/438
2003/0095038 A1 * 5/2003 Dix ........................ G07C 5/008 340/425.5
2005/0228560 A1 * 10/2005 Doherty ................. G07C 5/008 701/31.5
2006/0052919 A1 * 3/2006 Hong ..................... G07C 5/008 701/1
2007/0083303 A1 * 4/2007 O'Sullivan .......... G07C 5/0808 701/31.4
2007/0156311 A1 * 7/2007 Elcock ................... G07C 5/008 701/31.4
2008/0042802 A1 * 2/2008 Shaffer .................. G07C 5/008 701/2
2009/0062978 A1 * 3/2009 Picard ................ G06Q 30/0611 701/31.4
2012/0010775 A1 * 1/2012 Chenn .................... G07C 5/085 701/31.5
2012/0029759 A1 * 2/2012 Suh ...................... G05B 19/042 701/29.4
2012/0136527 A1 * 5/2012 McQuade .......... G06Q 30/0611 705/26.4
2013/0079972 A1 * 3/2013 Lake .................... G07C 5/0808 701/31.6
2013/0145482 A1 * 6/2013 Ricci ................ G08G 1/096844 726/28
2013/0204484 A1 * 8/2013 Ricci ....................... G06F 17/00 701/29.6
2013/0311002 A1 * 11/2013 Isaac ...................... G07C 5/008 701/2
2013/0317693 A1 * 11/2013 Jefferies ............. G06Q 30/0645 701/31.5
2014/0052327 A1 * 2/2014 Hosein .................... G06F 16/24 701/29.4
2015/0206357 A1 * 7/2015 Chen ................... G06F 16/2428 701/31.4
2016/0042576 A1 * 2/2016 Fischer .................. G07C 5/008 701/29.4
2016/0055684 A1 * 2/2016 Chen .................... G07C 5/0808 701/31.6
2016/0071334 A1 * 3/2016 Johnson ............... G07C 5/0808 701/29.1
2016/0071338 A1 * 3/2016 McQuade .............. B60K 35/00 701/34.4
2016/0078695 A1 * 3/2016 McClintic ............ G07C 5/0816 701/29.4
2016/0105365 A1 * 4/2016 Droste .................... H04L 67/12 370/236
2016/0110934 A1 * 4/2016 Ernst ...................... G07C 5/006 701/29.6
2016/0133062 A1 * 5/2016 Greenberg ............ G06F 40/106 701/29.4
2016/0328890 A1 * 11/2016 Keane .................... G07C 5/008
2017/0316621 A1 * 11/2017 Jefferies .................. B60R 25/01
2018/0229744 A1 * 8/2018 Manzari ................. F01M 11/10
2019/0228322 A1 * 7/2019 Wenner ................ G07C 5/0808
2019/0356552 A1 * 11/2019 Ricci .................. G02B 27/0101
2019/0362566 A1 * 11/2019 Mattern ................ G01M 17/00
2019/0369821 A1 * 12/2019 Merg ..................... G06Q 10/20
2019/0369843 A1 * 12/2019 Merg ................. G05B 23/0216
2019/0378350 A1 * 12/2019 DeRouen ............... G07C 5/008
2020/0168009 A1 * 5/2020 Jingle .................... G06V 20/62
2020/0202641 A1 * 6/2020 Grenier ............. H04L 12/40013
2020/0234515 A1 * 7/2020 Gronsbell ................ H04Q 9/00
2020/0258323 A1 * 8/2020 Colvin .................... G06F 3/061
2020/0302712 A1 * 9/2020 Yang ................... G01M 99/005
2020/0331483 A1 * 10/2020 Saers ...................... H04W 4/44
2020/0363296 A1 * 11/2020 Westlund ................. G06N 7/01
2020/0388154 A1 * 12/2020 Kim ........................ H04W 4/44
2020/0394853 A1 * 12/2020 Jung ................... H04L 43/0864
2020/0406860 A1 * 12/2020 Mai ......................... B60R 25/31
2021/0012586 A1 * 1/2021 Dutta ................. G07C 9/00857
2021/0049836 A1 * 2/2021 Covington ............. G07C 5/085
2021/0082207 A1 * 3/2021 Gonzalez ............... G07C 5/008
2021/0247729 A1 * 8/2021 Merg ................... G05B 19/042
2021/0284189 A1 * 9/2021 Giraud ................. G07C 5/0825
2021/0398363 A1 * 12/2021 Olalere .................. G06Q 10/20
2022/0122382 A1 * 4/2022 Mattern .................. G06F 13/24
2022/0319255 A1 * 10/2022 Palai ...................... G07C 5/008
2022/0335754 A1 * 10/2022 Palai ................. B60W 50/0205
2023/0063381 A1 * 3/2023 Brunda .................. G07C 5/008
2023/0196850 A1 * 6/2023 Weiland ............... G07C 5/0808 701/29.2

* cited by examiner

VEHICLE DIAGNOSIS AND REPAIR

PRIORITY INFORMATION

This Application is a Continuation of U.S. application Ser. No. 17/221,894, filed on Apr. 5, 2021, which claims the benefit of U.S. Provisional application No. 63/132,606, filed Dec. 31, 2020, the contents of which are herein incorporated by reference.

TECHNICAL FIELD

The present disclosure relates generally to apparatuses, non-transitory machine-readable media, and methods for vehicle diagnosis and repair.

BACKGROUND

A computing device is a mechanical or electrical device that transmits or modifies energy to perform or assist in the performance of human tasks. Examples include thin clients, personal computers, printing devices, laptops, mobile devices (e.g., e-readers, tablets, smartphones, etc.), internet-of-things (IoT) enabled devices, and gaming consoles, among others. An IoT enabled device can refer to a device embedded with electronics, software, sensors, actuators, and/or network connectivity which enable such devices to connect to a network and/or exchange data. Examples of IoT enabled devices include mobile phones, smartphones, tablets, phablets, computing devices, implantable devices, vehicles, home appliances, smart home devices, monitoring devices, wearable devices, devices enabling intelligent shopping systems, among other cyber-physical systems.

A computing device can be used to transmit information to users via a display to view images and/or text, speakers to emit sound, and/or a sensors to collect data. A computing device can receive inputs from sensors on or coupled to the computing device. The computing device can be coupled to a number of other computing devices and can be configured to communicate (e.g., send and/or received data) with the other computing devices and/or to a user of the computing device.

DETAILED DESCRIPTION

Figure 1:
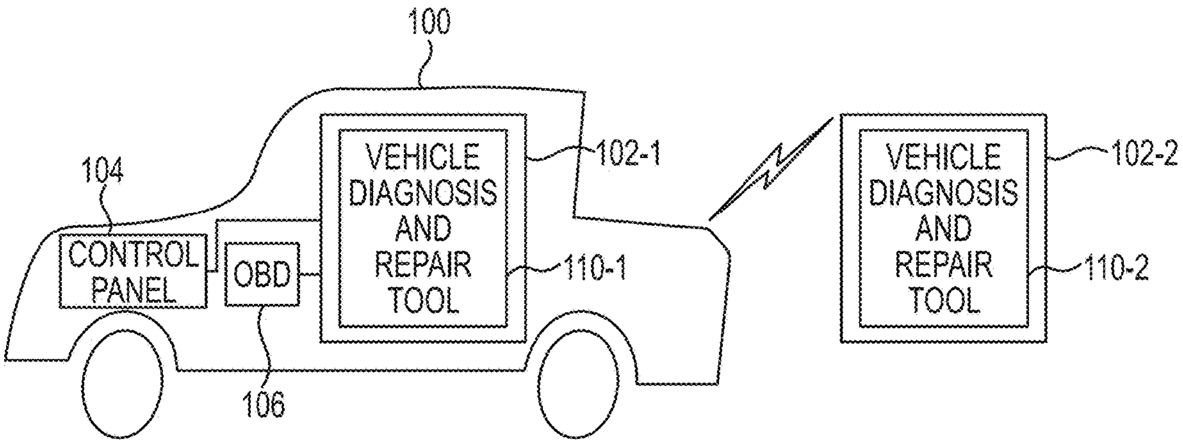
FIG. 1 is a functional diagram representing an example system for vehicle diagnosis and repair in accordance with a number of embodiments of the present disclosure.

Apparatuses, machine-readable media, and methods related to vehicle diagnosis and repair are described. Receiving vehicle status information from a control panel and/or on board diagnostic (OBD) unit of a vehicle at a vehicle diagnosis and repair tool can provide valuable information to an owner and/or user of a vehicle. Computing devices (e.g., mobile devices and/or modules having a computing device) can be configured to run an application (e.g., a vehicle diagnosis and repair tool) to determine whether a vehicle needs to be repaired or serviced. The vehicle diagnosis and repair tool can receive vehicle status information, determine the repairs and/or service that the vehicle needs, and initiate the vehicle repairs and/or service. The vehicle diagnosis and repair tool can be used to monitor the status of a vehicle so that any repairs and/or service to the vehicle can be done without intervention by the vehicle owner and/or operator and can be done during times when the vehicle is not in use. Therefore, the vehicle diagnosis and repair tool allows the vehicle repairs and/or service to be performed during times that are not an inconvenience to the vehicle owner and/or operator and such that the vehicle is available when the vehicle owner and/or operation desires. Also, the vehicle diagnosis and repair tool allows the vehicle owner and/or operator to not be burdened with scheduling vehicle repairs and/or service; or be burdened with having to drop off the vehicle, pick up the vehicle, and/or arrange a rental car and/or ride share service when the repair and/or service is being performed.

The vehicle diagnosis and repair tool can determine that a repair and/or service for the vehicle is needed using the vehicle status information received from the control panel and/or OBD unit of the vehicle. In response to determining that a repair and/or service for the vehicle is needed, the vehicle diagnosis and repair tool can send a request to a vehicle service provider to perform the repair or service. The repair or service can send an indication to the vehicle diagnosis and repair tool that includes confirmation the vehicle service provider can perform the service and/or repair, an estimate including details and cost of the service and/or repair, and a time frame for performing the service and/or repair. The vehicle diagnosis and repair tool can include user settings that indicate their preferred vehicle service provider, whether or not they need to confirm authorization to perform the repair and/or service diagnosed by the vehicle diagnosis and repair tool, whether or not they would like a rental car and/or ride share service while the repair and/or service is being performed, among other settings. The vehicle diagnosis and repair tool allows for the repair and/or service to be performed without intervention by the owner and/or operator of the vehicle and while the vehicle is not in use and/or before the vehicle will be used again by the owner and/or operator during their normal schedule (e.g., the repair and/or service does reduce the desired availability of the vehicle for the owner and/or operator).

In the following detailed description of the present disclosure, reference is made to the accompanying drawings that form a part hereof, and in which is shown by way of illustration how one or more embodiments of the disclosure can be practiced. These embodiments are described in sufficient detail to enable those of ordinary skill in the art to practice the embodiments of this disclosure, and it is to be understood that other embodiments can be utilized and that process, electrical, and structural changes can be made without departing from the scope of the present disclosure.

As used herein, designators such as "N," "M," etc., particularly with respect to reference numerals in the drawings, indicate that a number of the particular feature so designation can be included. It is also to be understood that the terminology used herein is for the purpose of describing particular embodiments only and is not intended to be limiting. As used herein, the singular forms "a," "an," and "the" can include both singular and plural referents, unless the context clearly dictates otherwise. In addition, "a number of," "at least one," and "one or more" (e.g., a number of memory devices) can refer to one or more memory devices, whereas a "plurality of" is intended to refer to more than one of such things. Furthermore, the words "can" and "may" are used throughout this application in a permissive sense (i.e., having the potential to, being able to), not in a mandatory sense (i.e., must). The term "include," and derivations thereof, means "including, but not limited to." The terms "coupled," and "coupling" mean to be directly or indirectly connected physically or for access to and movement (transmission) of commands and/or data, as appropriate to the context. The terms "data" and "data values" are used interchangeably herein and can have the same meaning, as appropriate to the context.

The figures herein follow a numbering convention in which the first digit or digits correspond to the figure number and the remaining digits identify an element or component in the figure. Similar elements or components between different figures can be identified by the use of similar digits. For example, 120 can reference element "20" in FIG. 1, and a similar element can be referenced as 220 in FIG. 2. As will be appreciated, elements shown in the various embodiments herein can be added, exchanged, and/or eliminated so as to provide a number of additional embodiments of the present disclosure. In addition, the proportion and/or the relative scale of the elements provided in the figures are intended to illustrate certain embodiments of the present disclosure and should not be taken in a limiting sense.

FIG. 1 is a functional diagram representing an example system for vehicle diagnosis and repair in accordance with a number of embodiments of the present disclosure. The system can include vehicle diagnosis and repair tool 110-1 and 110-2. The vehicle diagnosis and repair tool 110-1 and 110-2 can be located on and/or operated by computing devices 102-1 and 102-2, respectively. Computing device 102-1 can be on a module that is external to, couplable to, and removable from a control panel 104 and/or on board diagnostic (OBD) unit 106 of vehicle 100. Computing device 102-2 can be a mobile device of user of the vehicle diagnosis and repair tool 110-2. The user of the vehicle diagnosis and repair tool 110-2 can be the owner and/or operator of vehicle 100.

The vehicle diagnosis and repair tool 110-1 and 110-2 can be an application that is run using processing resources and/or memory resources of a computing device. Vehicle diagnosis and repair tool 110-1 can receive inputs from a control panel 104 and/or OBD unit 106 of a vehicle 100. The vehicle diagnosis and repair tool 110-1 can be wirelessly and/or physically coupled to the control panel 104 and/or OBD unit 106. The vehicle diagnosis and repair tool 110-1 can be implemented on a module that can be removably coupled to the control panel 104 and OBD unit 106, such that the module including the vehicle diagnosis and repair tool 110-1 can moved between vehicles. The vehicle diagnosis and repair tool 110-1 can be wirelessly connected via a Bluetooth connection and/or a Wi-Fi connection of the vehicle 100.

Vehicle diagnosis and repair tools 110-1 and 110-2 can be wirelessly coupled such that the vehicle diagnosis and repair tool 110-1 can send vehicle status information to vehicle diagnosis and repair tool 110-2. Vehicle diagnosis and repair tool 110-2 can use the vehicle status information to determine whether a repair and/or service is needed for the vehicle. If vehicle diagnosis and repair tool 110-2 determines that a repair and/or service is needed, the vehicle diagnosis and repair tool 110-2 can send a notification to the owner and/or operator of the vehicle and send a request to a vehicle service provider to perform the repair and/or service. The vehicle service provider can perform the repair and/or service without interaction with the owner and/or operator of the vehicle based on settings in the vehicle diagnosis and repair tool 110-2. For example, the vehicle diagnosis and repair tool 110-2 can include settings that indicate any repair and/or service diagnosed by vehicle diagnosis and repair tool 110-2 that is under $300 can be initiated by vehicle diagnosis and repair tool 110-1 and performed by a preferred vehicle service provider. Also, vehicle diagnosis and repair tool 110-2 can include a setting for a preferred vehicle service provider to perform any repair and/or service diagnosed by vehicle diagnosis and repair tool 110-2 that is necessary to make the vehicle operational. The vehicle diagnosis and repair tool 110-2 can include a setting to provide a garage and/or vehicle access code for a preferred vehicle service provider to access the vehicle to enable the preferred vehicle service to perform the repair and/or service on site or transport the vehicle to a shop to perform the repair and/or service.

Vehicle diagnosis and repair tool 110-2 can share the vehicle status information and the vehicle repair and/or service diagnosis with a contact list, a social media platform, and/or a vehicle repair forum. The contact list, social media platform, and/or vehicle repair forum can provide feedback to vehicle diagnosis and repair tool 110-2 and/or the vehicle owner and/or operator regarding the vehicle status information and the vehicle repair and/or service diagnosis. The feedback can be used by the vehicle diagnosis and repair tool 110-2 to make further suggestions for repair and/or service. The feedback can also be used by the vehicle diagnosis and repair tool 110-2 in making future repair and/or service suggestions.

Figure 2A:
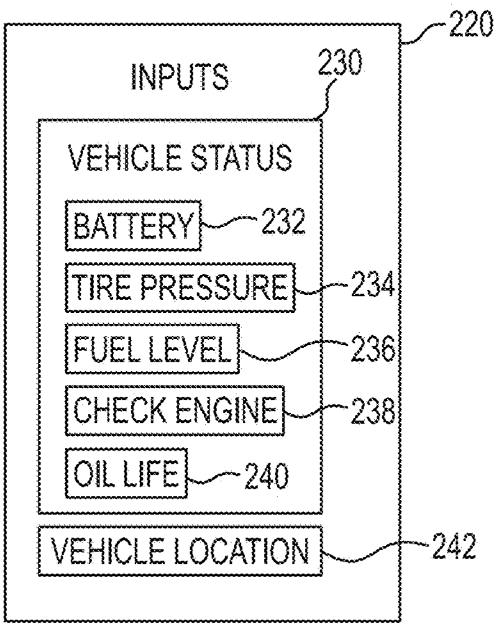
FIG. 2A is a diagram representing example of inputs for a vehicle diagnosis and repair tool in accordance with a number of embodiments of the present disclosure.

FIG. 2A is a diagram representing example of inputs for a vehicle diagnosis and repair tool in accordance with a number of embodiments of the present disclosure. Vehicle diagnosis and repair tool (e.g., vehicle diagnosis and repair tool 110-1 in FIG. 1) can receive a number of inputs 220. Inputs 220 can include vehicle status information 230. The vehicle status information 230 can be from a control panel and/or OBD unit of a vehicle. The vehicle status information 230 can include battery information 232, tire pressure information 234, fuel level information 236, check engine information 238, and/or oil life information 240.

Battery information 232 can indicate that the vehicle's battery is dead and needs to be replaced or jumped. Battery information 232 can quantify battery performance based on a charge level that the battery is maintaining which is used to determine if the battery needs to be replaced (e.g., replace in the particular time period such as in a day, a week, or a month) or needs to be jumped because the charge level is unable to start the vehicle. Vehicle diagnosis and repair tool can use the battery information 232 to initiate a service call to jump start the vehicle or a service call to replace the battery.

Tire pressure information 234 can indicate that the vehicle has a flat tire. Vehicle diagnosis and repair tool can use the tire pressure information 234 to initiate a service call to inflate, repair, and/or replace a vehicle's tire.

Fuel level information 236 can indicate that the vehicle is low on fuel. Vehicle diagnosis and repair tool can use the fuel level information 236 to initiate a service call to fill the vehicle with fuel or provide directions to the nearest fueling station.

Check engine information 238 can indicate that the control panel and/or OBD unit of the vehicle has detected a problem with the vehicle. The check engine information 238 can be used by the vehicle diagnosis and repair tool to determine the type of problem indicated by the check engine information 238 and determine a suggested repair and/or service to fix the problem. The vehicle diagnosis and repair tool can also share the check engine information 238 to solicit feedback on the best way to fix the problem.

Oil life information 240 can indicate that the vehicle is due for an oil change. Vehicle diagnosis and repair tool can use the oil life information 240 to initiate a service call to change the oil on the vehicle.

Inputs 220 can include vehicle location information 242. Vehicle location information 242 can be from a GPS unit of the vehicle and/or a GPS unit included on a module that includes the vehicle diagnosis and repair tool. Vehicle location information 242 can be received by the vehicle diagnosis and repair tool and sent to a vehicle service provider. The vehicle service provider can use the vehicle location information 242 to locate the vehicle to perform the service and/or repair at the vehicle location or to locate the vehicle for transport to a shop to perform the service and/or repair.

Figure 2B:
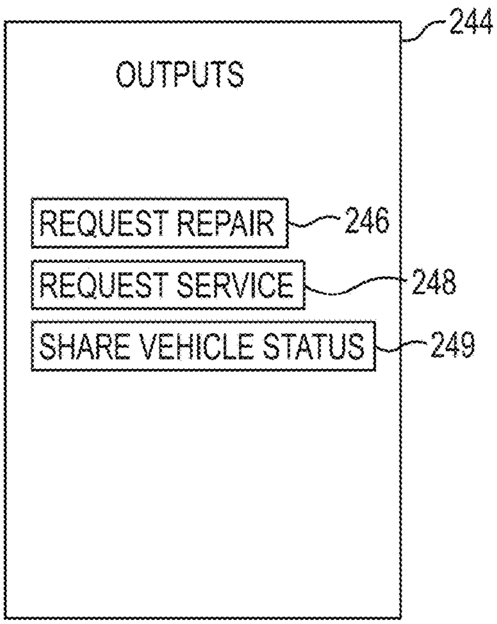
FIG. 2B is a diagram representing example of outputs for a vehicle diagnosis and repair tool in accordance with a number of embodiments of the present disclosure.

FIG. 2B is a diagram representing example of outputs for a vehicle diagnosis and repair tool in accordance with a number of embodiments of the present disclosure. Vehicle diagnosis and repair tool (e.g., vehicle diagnosis and repair tool 110-2 in FIG. 1) can send a number of outputs 244. Outputs 244 can include a repair request 246, request service 248, and share vehicle status 249.

A repair request 246 can be sent from a vehicle diagnosis and repair tool to a vehicle service provider to request a repair that was diagnosed by the vehicle diagnosis and repair tool. The repair request 246 can be sent to a preferred vehicle service provider as indicated in the settings of the vehicle diagnosis and repair tool by the vehicle owner and/or operator and/or to the nearest vehicle service provider based on the urgency of the needed repair.

A service request 248 can be sent from a vehicle diagnosis and repair tool to a vehicle service provider to request a service that was diagnosed by the vehicle diagnosis and repair tool. The service can be an oil change, a tire replacement, an air filter replacement, and/or a tire rotation, among other types of routine vehicle maintenance services. The service request 248 can be sent to a preferred vehicle service provider as indicated in the settings of the vehicle diagnosis and repair tool by the vehicle owner and/or operator.

The vehicle diagnosis and repair tool can share the vehicle status 249 with a contact list, a social media platform, and/or a vehicle repair forum. The contact list, social media platform, and/or vehicle repair forum can provide feedback to the vehicle diagnosis and repair tool and/or the vehicle owner and/or operator regarding the vehicle status information and the vehicle repair and/or service diagnosis. The feedback can be used by the vehicle diagnosis and repair tool to make further suggestions for repair and/or service. The feedback can also be used by the vehicle diagnosis and repair tool in making future repair and/or service suggestions.

Figure 3:
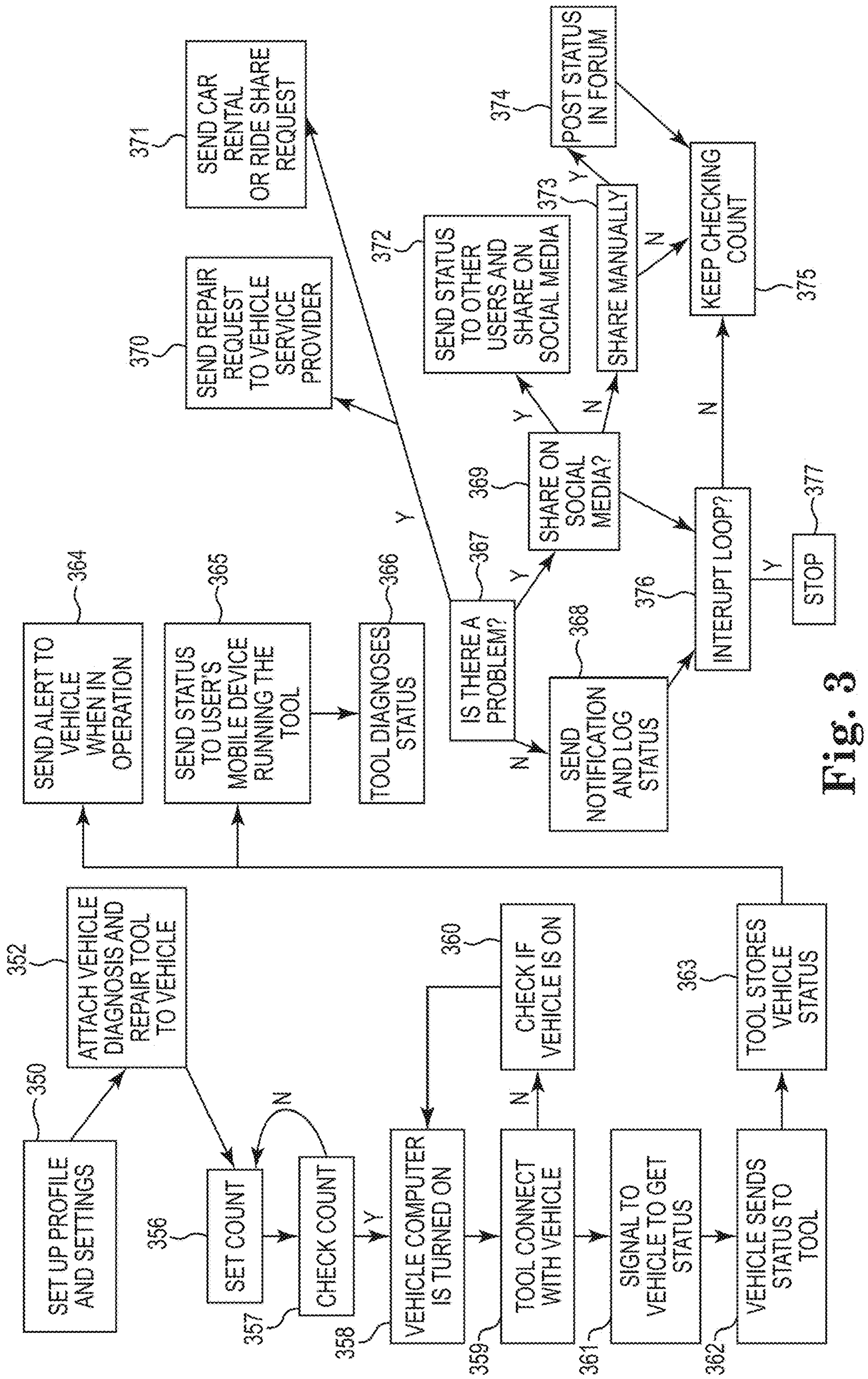
FIG. 3 is a flow diagram representing an example method for vehicle diagnosis and repair in accordance with a number of embodiments of the present disclosure.

FIG. 3 is a flow diagram representing an example method for vehicle diagnosis and repair in accordance with a number of embodiments of the present disclosure. The method includes setting up a profile and settings 350 in a vehicle diagnosis and repair tool. The settings can include indicating a preferred vehicle service provider, indicating whether you would like to confirm that a repair and/or service should be performed, indicating price and/or type of repair and/or service that can be performed without confirmation, indicating whether a rental car or ride share service should be procured while a repair and/or service is being performed, among other settings.

The method includes attaching a module that includes the vehicle diagnosis and repair tool 352 to a control panel and/or OBD unit of a vehicle. The module can be configured so that it can be swapped between different vehicles.

The method can include setting a count 356 that indicates a time period for performing a vehicle status diagnosis. For example, count 356 can be set at periodic time intervals, such as every hour, or can be set based on driving patterns so that a diagnosis is performed an hour before the vehicle is typically driven. The count can be checked 357. If the time for a diagnosis has not occurred, the count setting can be checked again to determine if it is time for diagnosis. If the time for a diagnosis has occurred, the battery of the vehicle can be used to turn the vehicle computer on 358.

The vehicle diagnosis and repair tool can connect to the control panel and/or OBD unit of the vehicle via a wired and/or wireless connection. If the vehicle diagnosis and repair tool does not connect to the vehicle, a check can be performed to determine if the vehicle is on 360 and the vehicle computer is turned on 358.

Once the vehicle diagnosis and repair tool is connected to the control panel and/or OBD unit of the vehicle, a signal is sent to the vehicle requesting vehicle status information 361. The control panel and/or OBD unit of the vehicle can send the vehicle status information to the vehicle diagnosis and repair tool 362 and the vehicle diagnosis and repair tool stores the vehicle status information 363. If the vehicle status information indicates a problem while the vehicle is being operated, a warning can be sent to the vehicle 364 and/or vehicle diagnosis and repair tool that is being operated on the user's mobile device. The warning can indicate to the vehicle operator that vehicle needs repair and/or that the vehicle should not be driven further until a repair is made.

The vehicle diagnosis and repair tool can diagnose the vehicle status information to determine whether the vehicle needs a repair and/or service. If there is not a problem 367, a notification can be sent to the user by the vehicle diagnosis and repair tool indicating that there is not a problem with the vehicle and the status of the vehicle can be logged by the vehicle diagnosis and repair tool 368. If there is a problem 367, a determination regarding whether to share the vehicle diagnosis on social media can be made 369. The vehicle diagnosis can be sent to other users of the vehicle diagnosis and repair tool and on social media platforms 372 based on a user setting in the vehicle diagnosis and repair tool. The vehicle diagnosis can be manually shared 373 via a post in a car repair forum 374 when the user does not want to share the vehicle diagnosis on social media platforms.

In response to the vehicle diagnosis detecting a problem 367, a repair request can be sent to a vehicle service provider 370. The vehicle service provider can be selected based on proximity to the vehicle or based upon a preference indicated in the user settings of the vehicle diagnosis and repair tool by the vehicle owner and/or operator.

In response to the vehicle diagnosis detecting a problem, a rental car request can be sent to a car rental provider and/or a ride request can be sent to a ride share provider 371. The car rental provider and/or ride share provider can be selected based on proximity to the vehicle or based upon a preference indicated in the user settings of the vehicle diagnosis and repair tool by the vehicle owner and/or operator.

In response to performing a vehicle diagnosis, a user of the vehicle diagnosis and repair tool can interrupt the diagnosis loop 376 so that vehicle diagnosis by the vehicle diagnosis and repair tool is stopped 377. In response to performing a vehicle diagnosis, a user of the vehicle diagnosis and repair tool can continue the diagnosis loop 376 so that vehicle diagnosis by the vehicle diagnosis and repair tool is continued 375 such that the method return to checking the count 357 to determine when the next vehicle diagnosis should begin.

Figure 4A:
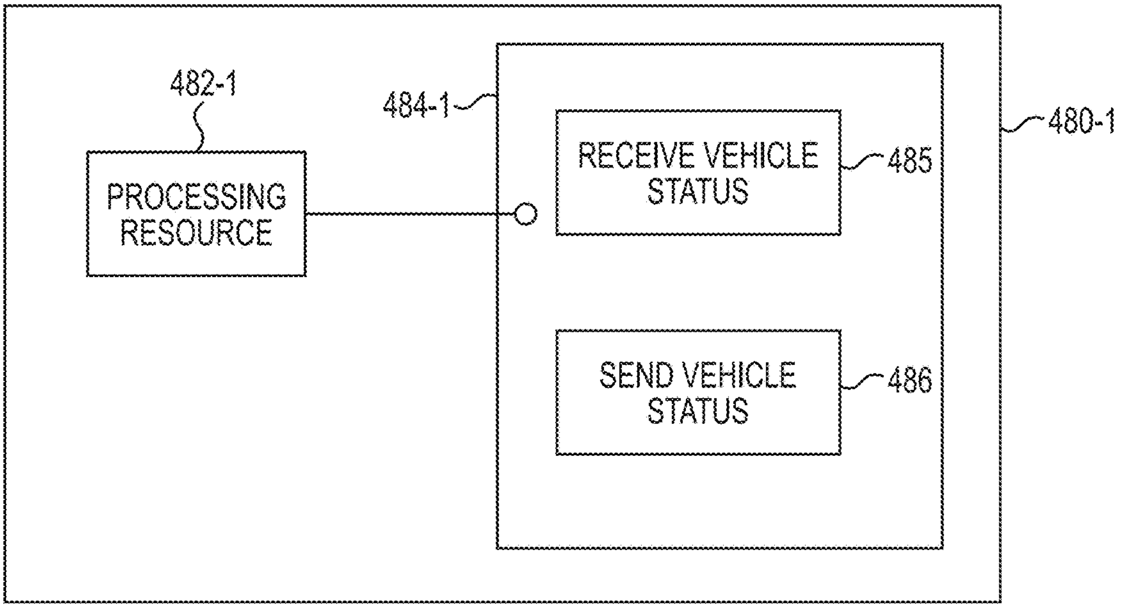
FIG. 4A is a functional diagram representing a processing resource in communication with a memory resource having instructions written thereon of a computing device coupled to a vehicle in accordance with a number of embodiments of the present disclosure.

FIG. 4A is a functional diagram representing a processing resource 482-1 in communication with a memory resource 484-1 having instructions 485, 486 written thereon of a computing device coupled to a vehicle in accordance with a number of embodiments of the present disclosure. In some examples, the processing resource 480-1 and memory resource 484-1 comprise a system 480-1 such as a vehicle diagnosis and repair tool (e.g., vehicle diagnosis and repair tool 110-1 illustrated in FIG. 1).

The system 480-1 illustrated in FIG. 4A can include a computing device on a module that can be removably coupled to a control panel and/or a on board diagnostic (OBD) unit of a vehicle. The system 480-1 can include a computing with processing resource 468. The system 480-1 can be coupled (e.g., coupled via a wireless network) to other systems and/or computing devices (e.g., system 480-2 in FIG. 4B). The system 480-1 can further include the memory resource 484-1 (e.g., a non-transitory MRM), on which may be stored instructions, such as instructions 485 and 486. Although the following descriptions refer to a processing resource and a memory resource, the descriptions may also apply to a system with multiple processing resources and multiple memory resources. In such examples, the instructions may be distributed (e.g., stored) across multiple memory resources and the instructions may be distributed (e.g., executed by) across multiple processing resources.

The memory resource 484-1 may be electronic, magnetic, optical, or other physical storage device that stores executable instructions. Thus, the memory resource 484-1 may be, for example, non-volatile or volatile memory. For example, non-volatile memory can provide persistent data by retaining written data when not powered, and non-volatile memory types can include NAND flash memory, NOR flash memory, read only memory (ROM), Electrically Erasable Programmable ROM (EEPROM), Erasable Programmable ROM (EPROM), and Storage Class Memory (SCM) that can include resistance variable memory, such as phase change random access memory (PCRAM), three-dimensional cross-point memory, resistive random access memory (RRAM), ferroelectric random access memory (FeRAM), magnetoresistive random access memory (MRAM), and programmable conductive memory, among other types of memory. Volatile memory can require power to maintain its data and can include random-access memory (RAM), dynamic random-access memory (DRAM), and static random-access memory (SRAM), among others.

In some examples, the memory resource 484-1 is a non-transitory MRM comprising Random Access Memory (RAM), an Electrically-Erasable Programmable ROM (EEPROM), a storage drive, an optical disc, and the like. The memory resource 484 may be disposed within a controller and/or computing device. In this example, the executable instructions 485 and 486 can be "installed" on the device. Additionally, and/or alternatively, the memory resource 484-1 can be a portable, external or remote storage medium, for example, that allows the system to download the instructions 485 and 486 from the portable/external/remote storage medium. In this situation, the executable instructions may be part of an "installation package". As described herein, the memory resource 484-1 can be encoded with executable instructions for vehicle diagnosis and repair.

The instructions 485, when executed by a processing resource such as the processing resource 482-1, can include instructions to receive at the processing resource 482-1, the memory resource 484-1, or both, vehicle status information from a control panel and/or an OBD unit of a vehicle. In some examples, the vehicle status information can include battery information, tire pressure information, fuel level information, check engine indicator information, oil life information, and/or vehicle location information, among other types of vehicle information.

The instructions 486, when executed by a processing resource such as processing resource 482-1, can include instructions send vehicle status information to a vehicle diagnosis and repair tool operating on a mobile device of user. The vehicle status information can be sent from system 480-1 to mobile device of user via a Bluetooth, cellular, and/or Wi-Fi data connection.

Figure 4B:
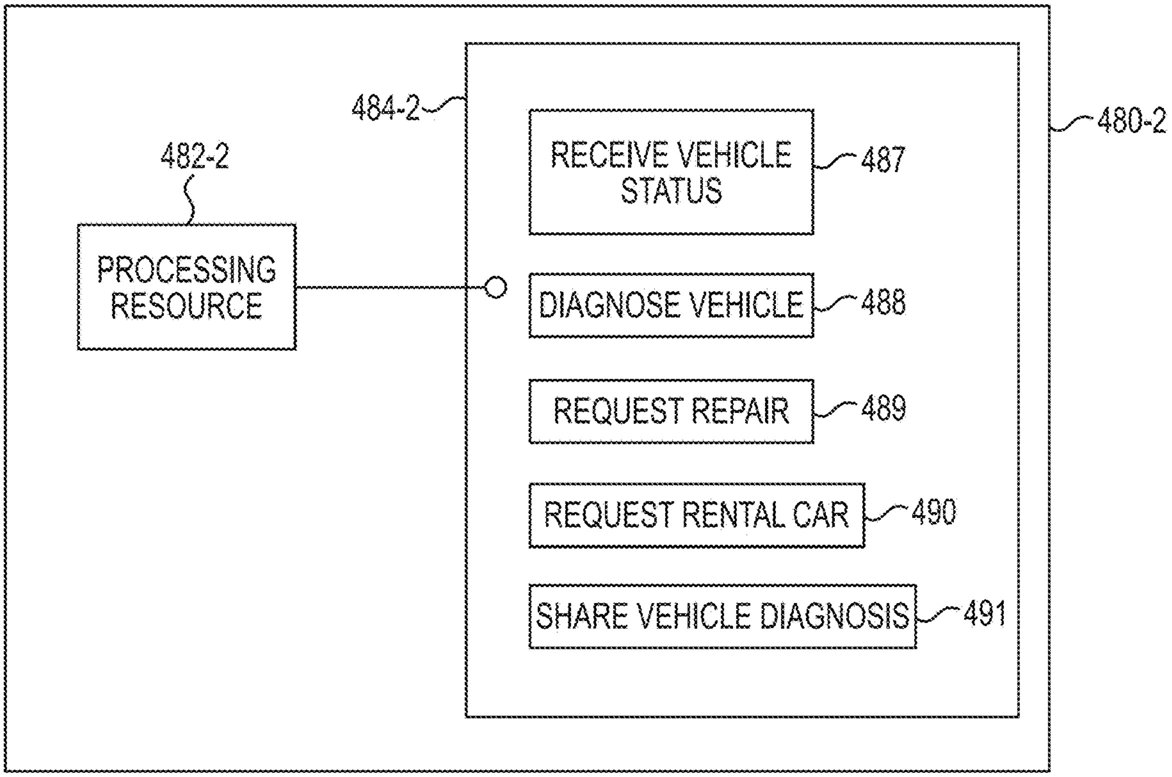
FIG. 4B is a functional diagram representing a processing resource in communication with a memory resource having instructions written thereon of a computing device of a user operating a vehicle diagnosis and repair tool in accordance with a number of embodiments of the present disclosure.

FIG. 4B is a functional diagram representing a processing resource 482-2 in communication with a memory resource 484-2 having instructions 487, 488, 489, 490, and 491 written thereon of a computing device of a user operating a vehicle diagnosis and repair tool in accordance with a number of embodiments of the present disclosure. In some examples, the processing resource 482-2 and memory resource 484-2 comprise a system 480-2 such as a vehicle diagnosis and repair tool (e.g., vehicle diagnosis and repair tool 110-2 illustrated in FIG. 1).

The system 480-2 illustrated in FIG. 4B can include a computing device of a user that is operating a vehicle diagnosis and repair tool. The system 480-2 can include a computing with processing resource 482-2. The system 480-2 can be coupled (e.g., coupled via a wireless network) to other systems and/or computing devices (e.g., system 480-1 in FIG. 4A). The system 480-2 can further include the memory resource 484-2 (e.g., a non-transitory MRM), on which may be stored instructions, such as instructions 487, 488, 489, 490, and 491. Although the following descriptions refer to a processing resource and a memory resource, the descriptions may also apply to a system with multiple processing resources and multiple memory resources. In such examples, the instructions may be distributed (e.g., stored) across multiple memory resources and the instructions may be distributed (e.g., executed by) across multiple processing resources.

The memory resource 484-2 may be electronic, magnetic, optical, or other physical storage device that stores executable instructions. Thus, the memory resource 484-2 may be, for example, non-volatile or volatile memory. For example, non-volatile memory can provide persistent data by retaining written data when not powered, and non-volatile memory types can include NAND flash memory, NOR flash memory, read only memory (ROM), Electrically Erasable Programmable ROM (EEPROM), Erasable Programmable ROM (EPROM), and Storage Class Memory (SCM) that can include resistance variable memory, such as phase change random access memory (PCRAM), three-dimensional cross-point memory, resistive random access memory (RRAM), ferroelectric random access memory (FeRAM), magnetoresistive random access memory (MRAM), and programmable conductive memory, among other types of memory. Volatile memory can require power to maintain its data and can include random-access memory (RAM), dynamic random-access memory (DRAM), and static random-access memory (SRAM), among others.

In some examples, the memory resource 484-2 is a non-transitory MRM comprising Random Access Memory (RAM), an Electrically-Erasable Programmable ROM (EEPROM), a storage drive, an optical disc, and the like. The memory resource 464 may be disposed within a controller and/or computing device. In this example, the executable instructions 487, 488, 489, 490, and 491 can be "installed" on the device. Additionally, and/or alternatively, the memory resource 484-2 can be a portable, external or remote storage medium, for example, that allows the system to download the instructions 487, 488, 489, 490, and 491 from the portable/external/remote storage medium. In this situation, the executable instructions may be part of an "installation package". As described herein, the memory resource 484-2 can be encoded with executable instructions for vehicle diagnosis and repair.

The instructions 487, when executed by a processing resource such as the processing resource 482-2, can include instructions to receive at the processing resource 482-2, the memory resource 484-2, or both, vehicle status information from another computing device. In some examples, the vehicle status information can include battery information, tire pressure information, fuel level information, check engine indicator information, oil life information, and/or vehicle location information, among other types of vehicle information.

The instructions 488, when executed by a processing resource such as processing resource 482-2, can include instructions to diagnosis the vehicle status information to determine if the vehicle needs service or repair.

The instructions 489, when executed by a processing resource such as processing resource 482-2, can include instructions to send a request to repair the vehicle to a vehicle service provider.

The instructions 490, when executed by a processing resource such as processing resource 482-2, can include instructions to send a request for a rental car to a rental car provider and/or to send a request for a ride from a ride share provider (e.g., Uber and/or Lyft).

The instructions 491, when executed by a processing resource such as processing resource 482-2, can include instructions to send vehicle status information and vehicle diagnosis information to others, such as member of a contact list, social media platforms, and or an online car repair forum.

Figure 5:
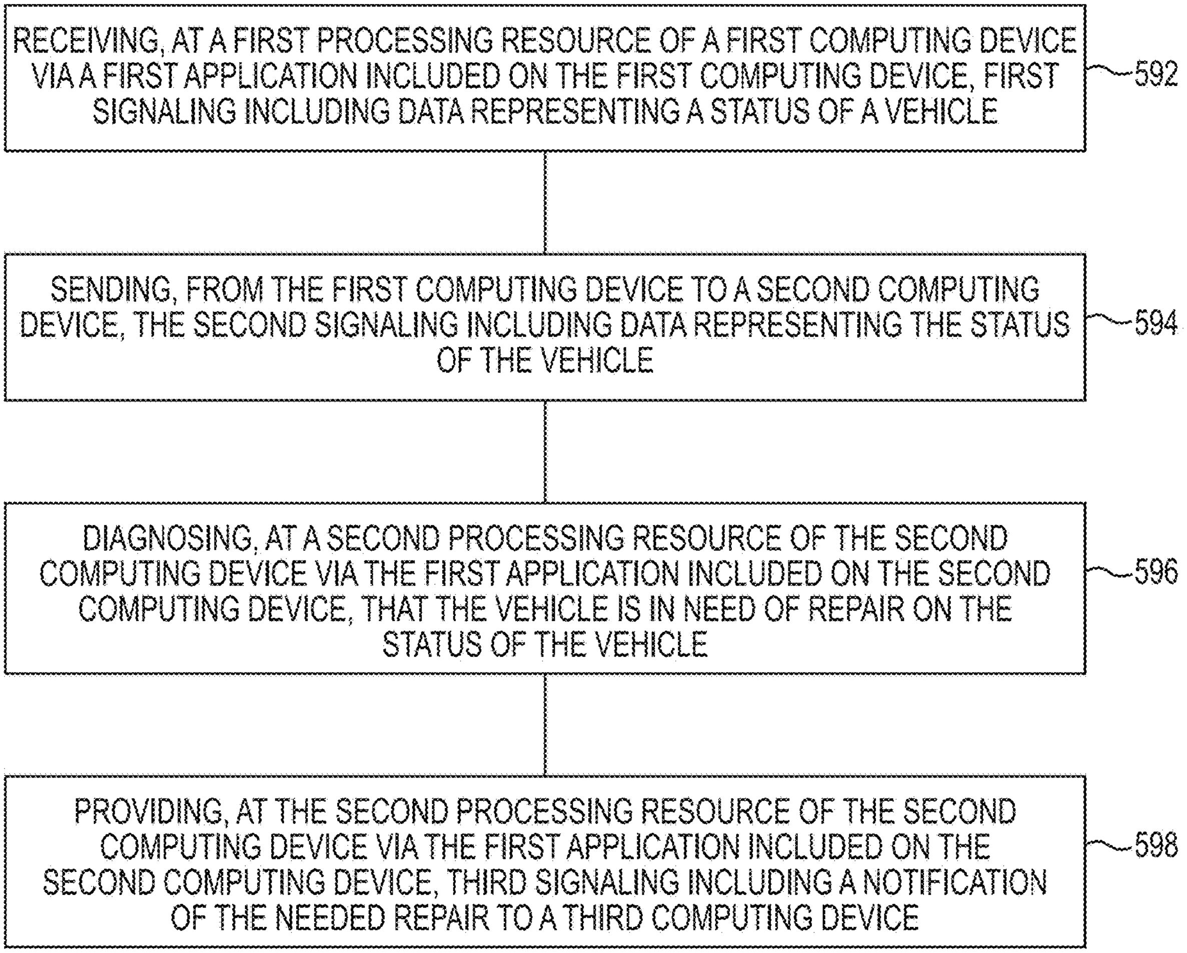
FIG. 5 is a flow diagram representing an example method for vehicle diagnosis and repair in accordance with a number of embodiments of the present disclosure.

FIG. 5 is a flow diagram representing an example method for vehicle diagnosis and repair in accordance with a number of embodiments of the present disclosure. At 592, the method includes receiving, at a first processing resource of a first computing device via a first application included on the first computing device, first signaling including data representing a status of a vehicle.

At 594, the method includes sending, from the first computing device to a second computing device, the second signaling including data representing the status of the vehicle.

At 596, the method includes diagnosing, at a second processing resource of the second computing device via the first application included on the second computing device, that the vehicle needs repair based on the status of the vehicle.

At 598, the method includes providing, at the second processing resource of the second computing device via the first application included on the second computing device, third signaling including a notification of the needed repair to a third computing device.

Although specific embodiments have been illustrated and described herein, those of ordinary skill in the art will appreciate that an arrangement calculated to achieve the same results can be substituted for the specific embodiments shown. This disclosure is intended to cover adaptations or variations of one or more embodiments of the present disclosure. It is to be understood that the above description has been made in an illustrative fashion, and not a restrictive one. Combination of the above embodiments, and other embodiments not specifically described herein will be apparent to those of skill in the art upon reviewing the above description. The scope of the one or more embodiments of the present disclosure includes other applications in which the above structures and processes are used. Therefore, the scope of one or more embodiments of the present disclosure should be determined with reference to the appended claims, along with the full range of equivalents to which such claims are entitled.

In the foregoing Detailed Description, some features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A method, comprising:

receiving, at a first processing resource of a first computing device via a first application included on the first computing device, first signaling including data representing a status of a vehicle;

sending, from the first computing device to a second computing device, the second signaling including data representing the status of the vehicle;

diagnosing, at a second processing resource of the second computing device via the first application included on the second computing device, that the vehicle needs repair based on the status of the vehicle; and sending, from second computing device to a service provider, a request to schedule a service appointment with the service provider to repair the vehicle based on the diagnosis needs repair during a time when the vehicle will not be in use and based on an estimated cost to repair the vehicle being below a threshold dollar amount.

2. The method of claim 1, further comprising sending, at the second computing device via the first application included on the second computing device, an indication of the needed repair to other computing devices that are operating the first application.

3. The method of claim 2, further comprising receiving, at the second computing device via the first application included on the second computing device, information regarding how to perform the needed repair from the other computing devices that are operating the first application.

4. The method of claim 1, further comprising diagnosing, at the second processing resource of the second computing device via the first application included on the second computing device, that the vehicle is in working order based on the status of the vehicle.

5. The method of claim 4, further including providing, at the second processing resource of the second computing device via the first application included on the second computing device, fourth signaling including a notification that the vehicle is in working order to the second computing device.

6. The method of claim 1, further comprising sending, at the second computing device via the first application included on the second computing device, a request to a vehicle service provider to make the needed repair to the vehicle.

7. The method of claim 1, further comprising sending, at the second computing device via the first application included on the second computing device, a request for a rental car while the vehicle is being repaired.

8. The method of claim 1, further comprising sending, by the first processing resource of the first computing device via the first application included on the first computing device, a request for signals from an on board diagnostic (OBD) unit of the vehicle, wherein the first computing device is external to the ODB unit of the vehicle is removable couplable to the vehicle.

9. The method of claim 1, further comprising providing, at the second processing resource of the second computing device via the first application included on the second computing device, third signaling including a notification of the needed repair to a third computing device.

10. A system, comprising:

a first computing device comprising a first processing resource configured to execute instructions stored in a first memory to:

receive first signaling including data representing a status of a vehicle; and a second computing device comprising a second processing resource configured to execute instructions stored in a second memory to:

receive second signaling including data representing the status of the vehicle from the first computing device; and diagnose whether or not the vehicle is in need of repair based on the status of the vehicle; and send a request to a vehicle service provider to make the needed repair to the vehicle during a time when the vehicle will not be in use and based on an estimated cost to repair the vehicle being below a threshold dollar amount.

11. The system of claim 10, wherein the second processing resource is configured to execute instructions to receive an indication from the vehicle service provider that the needed repair is completed.

12. The system of claim 11, wherein the first processing resource is configured to execute instructions to receive the indication that the needed repair is completed and to receive data representing an updated status of the vehicle.

13. The system of claim 10, wherein the first processing resource is configured to execute instructions to receive signaling including data representing the status of the vehicle at periodic intervals and wherein the first computing device is external to an on board diagnostic (OBD) unit of the vehicle is removably couplable to the vehicle.

14. The system of claim 10, wherein the second processing resource is configured to execute instructions to provide the indication that that vehicle needs repair to a contact list.

15. A non-transitory machine-readable medium comprising a first processing resource in communication with a memory resource having instructions executable to:

receive at the first processing resource, the memory resource, or both, data representing a need for a vehicle repair, via first signaling sent via a first radio in communication with a second processing resource of a computing device coupled to a vehicle; and transmit at the first processing resource, the memory resource, or both, data representing a request for the vehicle repair to a vehicle service provider via a second radio in communication with the first processing resource, wherein the request is for the repair to occur during a time when the vehicle will not be in use and based on an estimated cost to repair the vehicle being below a threshold dollar amount.

16. The medium of claim 15, further including having instructions executable to receive at the first processing resource, the memory resource, or both, data indicating that the vehicle service provider has completed the vehicle repair via the radio in communication with the processing resource of the computing device associated with the vehicle service provider.

17. The medium of claim 15, further including receiving at the first processing resource, the memory resource, or both, data indicating that the vehicle service provider will perform the vehicle repair via the radio in communication with the processing resource of the computing device associated with the vehicle service provider.

18. The medium of claim 15, further including having instructions executable to send at the first processing resource, the memory resource, or both, data representing the need for the vehicle repair, via first signaling sent via a radio in communication with a processing resource of a computing device associated with manufacturer of the vehicle.

19. The medium of claim 15, further including having instructions executable to receive at the first processing resource, the memory resource, or both, data indicating a repair and cost estimate for the vehicle repair via the radio in communication with the processing resource of the computing device associated with the vehicle service provider.

20. The medium of claim 15, further including having instructions executable to send at the first processing resource, the memory resource, or both, data representing the need for the vehicle repair, via first signaling sent via a radio in communication with a processing resource of a computing device associated with a social media network.

* * * * *